United States Patent [19]

Uchida

[11] Patent Number: 4,818,579

[45] Date of Patent: Apr. 4, 1989

[54] SHEET FOR FORMING TWISTED FLAPS IN CONTINUOUS ARRANGEMENT AND METHOD OF PRODUCING SAME

[75] Inventor: Hiroshi Uchida, Ashikaga, Japan

[73] Assignee: Earthnics Corporation, Tokyo, Japan

[21] Appl. No.: 130,383

[22] PCT Filed: Mar. 18, 1987

[86] PCT No.: PCT/JP87/00169

§ 371 Date: Nov. 17, 1987

§ 102(e) Date: Nov. 17, 1987

[87] PCT Pub. No.: WO87/05642

PCT Pub. Date: Sep. 24, 1987

[30] Foreign Application Priority Data

Mar. 18, 1986 [JP] Japan .................................. 61-61578
Apr. 23, 1986 [JP] Japan .................................. 61-94219

[51] Int. Cl.<sup>4</sup> ............................................... B32B 1/06
[52] U.S. Cl. .................................... 428/102; 112/429; 428/131; 428/134; 428/137; 428/225; 428/232
[58] Field of Search ................... 112/429, 430; 28/144; 428/102, 131, 134, 137, 232, 225

[56] References Cited

U.S. PATENT DOCUMENTS

| 520,400 | 5/1894 | Cattlow | 28/144 |
| 3,058,193 | 10/1962 | Mauersberger et al. | 28/144 |
| 3,541,653 | 11/1970 | Stevenson | 28/144 |
| 4,517,715 | 5/1985 | Yoshida et al. | 28/144 |

FOREIGN PATENT DOCUMENTS 0081349 5/1985 Japan .
289631 12/1987 Japan .

Primary Examiner—James J. Bell
Attorney, Agent, or Firm—Armstrong, Nikaido Marmelstein & Kubovcik

[57] ABSTRACT

The invention provides a sheet for forming twisted flaps in a continuous arrangement which comprises a sheet material and a stitching thread attached to the sheet material to form one or a plurality rows of stitches in a wave pattern or stitches in a reticular pattern, the sheet material being formed with incisions each in each of areas surrounded by stitches. When the thread is pulled, the sheet material is opened at the incisions to form a multiplicity of raised, curved flaps inclined with respect to the longitudinal direction of the thread. Methods of producing such sheets are also provided. The sheet provided is advantageously usable as a water contact material for biological water treatment, slope protective material for civil engineering work, etc.

27 Claims, 6 Drawing Sheets

SHEET FOR FORMING TWISTED FLAPS IN CONTINUOUS ARRANGEMENT AND METHOD OF PRODUCING SAME

FILED OF INDUSTRIAL APPLICATION

The present invention relates to sheet for use as water contact materials for forming biological films or filter materials for use in biological water treatment by an aeration or non-aeration process, as underwater nurseries for growing laver or like vegetables, artificial fish-breeding shelters (for spawning), hydroponic culture beds, as slope protective materials for civil engineering work, etc., and to methods of producing such materials.

Prior Art

Figure 11A:
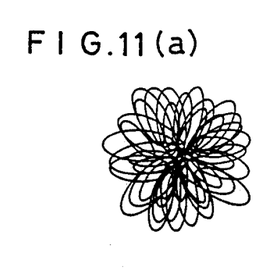
FIGS. 11(a) and (b) includes a plan view and a front view showing an example of conventional water treating contact material.
Figure 11B:
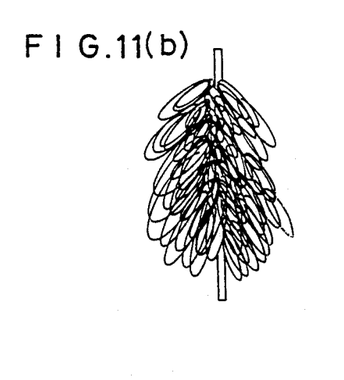

Conventional materials for use in contact with water for forming biological films in biological water treatment by an aeration or non-aeration process include one which is in the form of a continuous string of loops of very thin vinylidene choride thread as shown in FIGS. 9 (a) and (b).

The string-like contact material has the following advantages. (i) The loops flutter with currents of water and therefore achieve a high sewage contact efficiency. (ii) The thin thread is arranged three-dimensionally in the form of numerous loops, which retain a large quantity of microorganisms thereon with strong adhesion without readily releasing them. (iii) Being in the form of a string, the material can be installed in the sewage treating aeration tank as desired in accordance with the structure and input load of the tank.

Nevertheless, the string-like contact material has the drawback that as a progressively increasing amount of microorganisms adhere to the loops of thread, the surfaces of the loops become covered with a sticky substance, making the whole assembly resemble a rod as if by clogging to result in a greatly reduced area of contact.

Next, slope protective materials for use in civil engineering work will be described. Conventional materials for use in protecting slopes include the following. (i) Perforated circular steel strips assembled into circular members, which are laid over the slope as interconnected. (ii) Reticular plates assembled into a lattice over the slope (see Unexamined Japanese Patent Publication SHO No. 55-36557). (iii) A netlike frame which, when stretched, forms a continuous arrangement of square meshes (see Unexamined Japanese Patent Publication SHO No. 56-16730).

However, these protectors have problems. The protectors (i) and (ii) are heavy, and even before use, they are bulky, hence inconvenient to store and transport. With the protector (iii), the frame members forming the meshes merely have a simple straight linear form and therefore fail to satisfactorily retain earth, sand or mortar.

OBJECTS OF THE INVENTION

Accordingly, a first object of the present invention is to provide a material which is lightweight, not bulky before use and therefore easy to handle, store and transport, and which is suitable for use as a water-treating contact material and slope protective material, the material being also usable for underwater nurseries for growing laver or like vegetables, artificial fish-breeding shelters, hydroponic culture beds, etc.

A second object of the present invention is to provide a method of preparing the material with a high efficiency.

Means for Achieving the Objects

To fulfill the first object, the present invention provides a sheet for forming twisted flaps in a continuous arrangement comprising a strip having incisions extending widthwise thereof alternately from its opposite side edges beyond the longitudinal center line of the strip, and a stitching thread attached to the strip by stitching and extending longitudinally of the strip in a wave pattern through a position in the vicinity of the terminal end of each of the incisions, so that when the stitching thread is pulled apart at its opposite ends, the strip forms raised and curved flaps inclined with respect to the longitudinal direction of the stretched thread.

To fulfill the first object, the invention further provides a sheet for forming twisted flaps in a continuous arrangement comprising a piece of sheet material and a plurality of stitching threads extending on the sheet material in the same direction in a plurality of rows of wave pattern and attached to the sheet material by stitching, each of the threads intersecting wave vertexes of the adjacent threads at its opposite sides alternately at an interval of a predetermined number of waves of the wave pattern to form intersections, the sheet material being formed with a longitudinal incision extending between two intersections adjacent to each other in the direction in which the threads extend in rows and with transverse incisions extending from the longitudinal incision transversely thereof to positions close to the respective vertexes, remote from each other, of the thread wave pattern, so that when the stitching threads are pulled apart at their opposite ends, the sheet material forms raised, curved flaps inclined with respect to the longitudinal direction of the stretched threads.

To fulfull the first object, the invention further provides a sheet for forming twisted flaps in a continuous arrangement comprising a piece of sheet material and a plurality of stitching threads attached to the sheet material by stitching in a reticular pattern, the sheet material having incisions parallel to one another and each formed in each mesh of the pattern, the incision extending between positions close to opposed corners of the mesh, so that when the sheet material is stretched by pulling the threads apart at their ends at the corners of the sheet material transversely of the incisions, the sheet material is opened at the incisions and forms raised, curved flaps inclined with respect to the longitudinal direction of the threads.

To fulfill the second object, the invention provides a method of producing a sheet for forming twisted flaps in a continuous arrangement, the method including the steps of attaching a stitching thread to a sheet material by stitching in a plurality of rows in a wave pattern and extending in the same direction to each other, successively forming transverse incisions each extending between positions close to vertexes, remote from each other, of stitches of the wave pattern thread rows adjacent to each other, and cutting the sheet material into separate pieces between the adjacent thread rows.

To fulfill the second object, the invention further provides a method of producing a sheet for forming twisted flaps in a continuous arrangement, the method including the first stitching step of attaching a first stitching thread to a sheet material by stitching in a plurality of rows extending in the same direction and arranged at a predetermined spacing, each row having stitches in a wave pattern and vertexes projecting to a higher level than the other vertexes thereof at an interval of a specified wave number, the second stitching step of attaching a second stitching thread to the sheet material by stitching in a wave pattern between the thread rows, the second thread having vertexes projecting to a higher level than the other vertexes thereof at an interval of a specified wave number and each intersecting the higher vertex of the first thread to form an intersection, the first incision forming step of successively forming transverse incisions each extending between positions close to vertexes, remote from each other, of wave pattern stitches of the first and second threads adjacent to each other, and the second incision forming step of successively forming longitudinal incisions each extending between positions close to each two intersections of the first and second threads adjacent to each other in the direction in which the thread rows extend.

To fulfill the second object, the invention further provides a method of producing a sheet for forming twisted flaps in a continuous arrangement including the steps of attaching a stitching thread to a sheet material in a reticular pattern by moving a plurality of stitching needles zigzag to form intersecting stitches on the sheet material, and successively forming incisions in the sheet material in parallel to one another and each extending between positions close to opposed corners of each mesh.

The term "incisions" as used herein and in the appended claims means cut-out lines, punched lines, cut line, etc.

The stitching thread can be attached to the sheet material, for example, by usual stitches, loop stitches or double-loop stitches.

The sheet materials usable include, for example, woven fabric, nonwoven fabric, synthetic resin sheet, perforated sheet obtained by forming small holes in such material and sheet having an expanded material provided over at least one side thereof.

Examples of stitching threads are those of cotton, hemp and like natural fibers, vinylon, polyamide (nylon) and like synthetic fibers, and those prepared from a blend of such fibers.

The wave pattern of the thread on the net forming member can be a triangular wave, sinusoidal, trapezoidal or like suitable pattern.

Advantages

When the ends of the stitching thread in a wave pattern on the twisted flap forming sheet of the invention are pulled apart, the thread is stretched straight, causing the sheet material to open at the incisions and bend to form raised, curved flaps (hereinafter referred to as twisted flaps) which are inclined with respect to the longitudinal direction of the stretched thread.

In the case of the twisted flap forming sheet of the invention having threads in a reticular pattern, the sheet material is opened at the incisions and bent to form twisted flaps when the ends of threads positioned sidewise of the incisions are pulled apart transversely thereof.

Accordingly, with the sheet of either type, a multiplicity of flaps are readily obtained in a continuous arrangement by merely pulling the thread. When the sheet is used in biologically treating water for forming a biological contact film, the sheet exhibits exactly the same advantages as the conventional contact material already described. Microorganisms lodge on the surface of the sheet material, while flaps in each row flutter with the flow of sewage and contact the sewage with improved efficiency. Even when an increased amount of microorganisms are deposited on the sheet material, the surface area of the sheet material remains almost unchanged, permitting the sheet to retain a high contact efficiency. The present sheet can be installed in the sewage treating aeration tank or the like as desired according to the load. Moreover, the sheet can be installed in place as tensioned greatly, with the meshes of the net largely opened. Consequently, even if rows of nets are fluttered by a flow of water, the sludge deposit will not be released by contact with the adjacent row.

For use as a slope protective material, the flap forming sheet of the present invention is stretched in the form of a net. The sheet then serves the function of supporting the soil placed thereon or the mortar or the like applied thereto chiefly by the raised flaps and also transmitting the load to the thread so that the thread supports the load. In this way, the present sheet performs the two functions required of such slope protective material. In this case, therefore, the sheet material needs only to have strength sufficient for each flap to retain the soil or the like between one incision to the next incision and rigidity to prevent the flap from falling by the placement of soil or spraying, while the thread needs only to have such tensile strength as to support the weight of the soil, mortar or the like delivered thereto through the sheet material. Each of the thread and the sheet material can accordingly be of a material suited to the function required thereof, with the result that the present sheet can be made in its entirety lightweight and less bulky in a flat form before stretching for facilitated storage, transport and handling.

Further when the twisted flap forming sheet of the invention is to be used as a sewage contact material or for underwater nurseries for growing vegetables, artificial fish-breeding or gathering shelters, hydroponic beds or the like, suitable materials are selectable for the sheet material and the thread so that the present sheet can be made in its entirety lightweight, flat and less bulky before use, and therefore easy to store, transport and handle.

The sheet producing method of the invention including the wave pattern stitching step and the production method thereof including the reticular pattern stitching step both make it possible to manufacture twisted flap forming sheets having the foregoing advantages, continuously by a sequence of steps by virtue of continuous stitching and successive formation of incisions to achieve high productivity.

The above and other objects, features and advantages of the present invention will become apparent from the following description of embodiments of the invention (which is not limited by these embodiments) with reference to the accompanying drawings.

EMBODIMENTS

Figure 1:
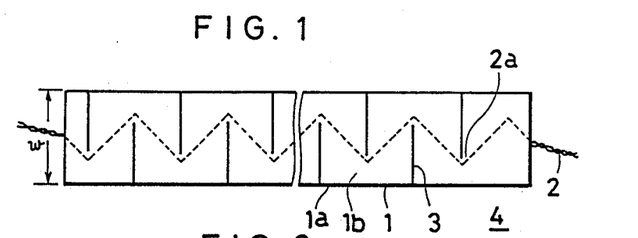
FIG. 1 is a plan view showing a first embodiment of the invention, i.e., a twisted flap forming sheet.
Figure 2:
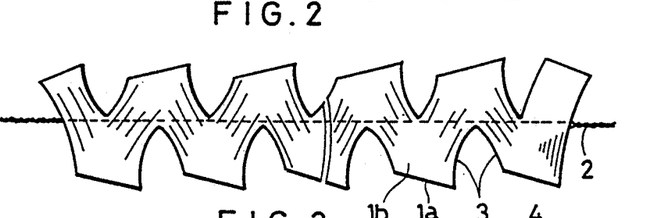
FIG. 2 is a plan view showing the twisted flap forming sheet of FIG. 1 as stretched.

FIG. 1 shows an embodiment of the invention, i.e., a sheet for forming twisted flaps in a continuous arrangements. The sheet comprises a strip 1 of nonwoven fabric, for example 5 cm in a width and several tens of meters in length, and a stitching thread 2 attached to the strip 1 by stitching and extending longitudinally thereof in a triangular wave pattern. The thread 2 is a nylon filament yarn (grade number 3, tensile strength 9450 g) and is attached by usual stitches, loop stitches or double-loop stitches. The strip 1 has incisions 3 extending widthwise of the strip alternately from its opposite side edges beyond the longitudinal center line of the strip. The stitching thread 2 in the wave pattern extends through a position in the vicinity of the terminal end of each incision 3. When the thread is stretched by pulling its opposite ends apart, the strip 1 is opened at the incisions 3, forming a multiplicity of raised, curved flaps 1b inclined with respect to the longitudinal direction of the thread in a continuous arrangement as seen in FIG. 2.

When a plurality of such flap forming sheets of the present embodiment are connected together into a net, the net is usable as a slope protective material for civil engineering work. When they are arranged side by side closely, the arrangement is usable as a water-treating contact material, nursery or the like. In either case, the raised curved flaps 1b produce an outstanding effect. Such applications will be described in detail with reference to other embodiments given later.

Figure 3:
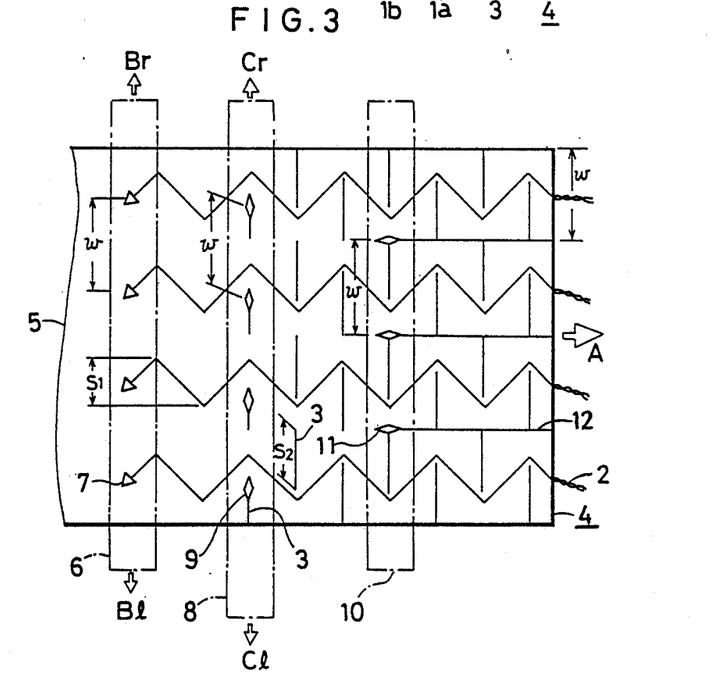
FIG. 3 is a diagram for illustrating a method for producing the twisted flap forming sheet of FIG. 1.

FIG. 3 is a diagram for illustrating an example of process for producing the sheet of the above embodiment. In this process, a sheet material 5 has four times the width w of the sheet 4 to be produced and is fed at a constant speed in the direction of arrow A. The path of feed of the sheet material 5 is provided with a sewing machine 6 having four needles 7 which are arranged at the same spacing as the width w of the sheet 4 to be obtained. Each of the needles 7 reciprocatingly moves in the direction of arrows B1 and Br with an amplitude S1 smaller than the width w and forms stitches in a triangular wave pattern in cooperation with the feed of the sheet material 5. A first slitter 8 having four cutting blades 9 is disposed in the path of feed of the blank sheet 5 downstream from the sewing machine 6. The blades 9 are arranged at a spacing w, reciprocatingly move in the directions of arrows C1 and Cr with an amplitude of S2 and form transverse incisions 3 extending widthwise of the sheet material 5 in cooperation with the feed of the sheet material 5. In this case, the position and the amplitude S2 of each blade 9 is so determined that the transverse incision 3 will extend between positions close to the vertexes, away from each other, of the triangular wave stitch patterns of the adjacent stitching threads. A second slitter 10 having three cutting blades 11 is further disposed in the path of feed of the sheet material 5 downstream from the first slitter 8. The blades 11 are positioned between the rows of triangular wave stitch patterns and cut the sheet material 5 with the feed of the sheet material, forming sheets 4 each having the width w for forming twisted flaps in a continuous arrangement.

Figure 4:
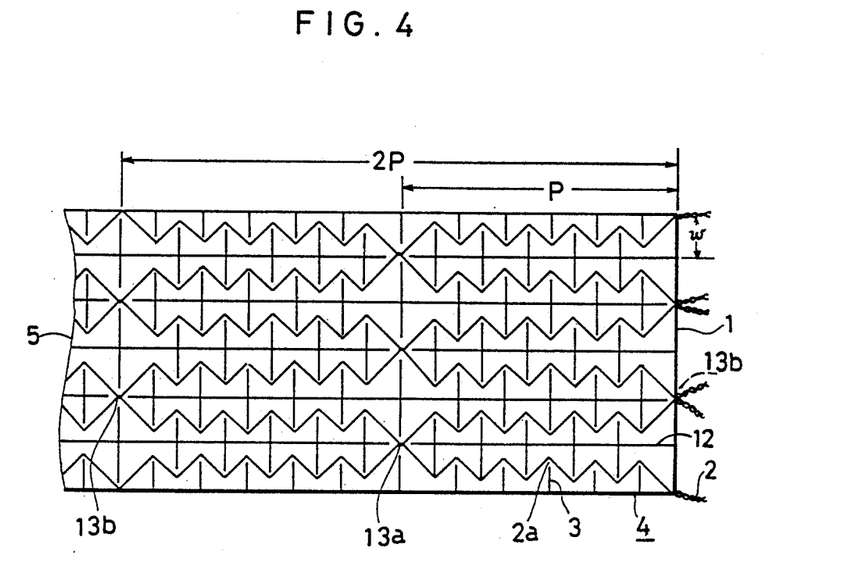
FIG. 4 is a plan view showing another twisted flap forming sheet embodying the invention.

FIG. 4 shows another twisted flap forming sheet embodying the invention. As will become apparent from the description to follow, the sheet serves as a net forming member. The sheet comprises a sheet material 1 of nonwoven fabric having an increased width of 2 m and a length of several tens of meters, and a plurality of stitching threads 2 attached to the sheet material over the entire area thereof by stitching. These threads are nylon filament yarns (grade number 3, tensile strength 9450 g) and form usual stitches, loop stitches or double loop stitches in a plurality of rows. Each row extends in a triangular wave pattern in a reverse phase with that of the row adjacent thereto. At an interval of a predetermined number of waves (i.e. at a pitch p), the row intersects wave vertexes of the adjacent threads 2 at its opposite sides alternately to form intersections 13a, 13b. The sheet material 1 is formed with a longitudinal incision 12 extending between positions close to each two adjacent intersections adjacent to each other in the direction in which the threads 2 extend in rows, and with transverse incisions 3 across the longitudinal incision 12 and extending between positions 2a close to the respective vertexes, remote from each other, of the stitch rows adjacent to each other. The sheet material 1 is further formed with transverse incisions 3 extend from each side edge thereof to positions 2a close to the vertexes of the thread 2 at the side edge portion. Owing to the presence of these incisions, the threads 2, when pulled apart at their opposite ends, cause the sheet material 1 to form raised, curved flaps as inclined with respect to the longitudinal direction of the threads 2 stretched straight. The flaps thus formed resemble those of the foregoing embodiment already described with reference to FIG. 2.

Figure 5:
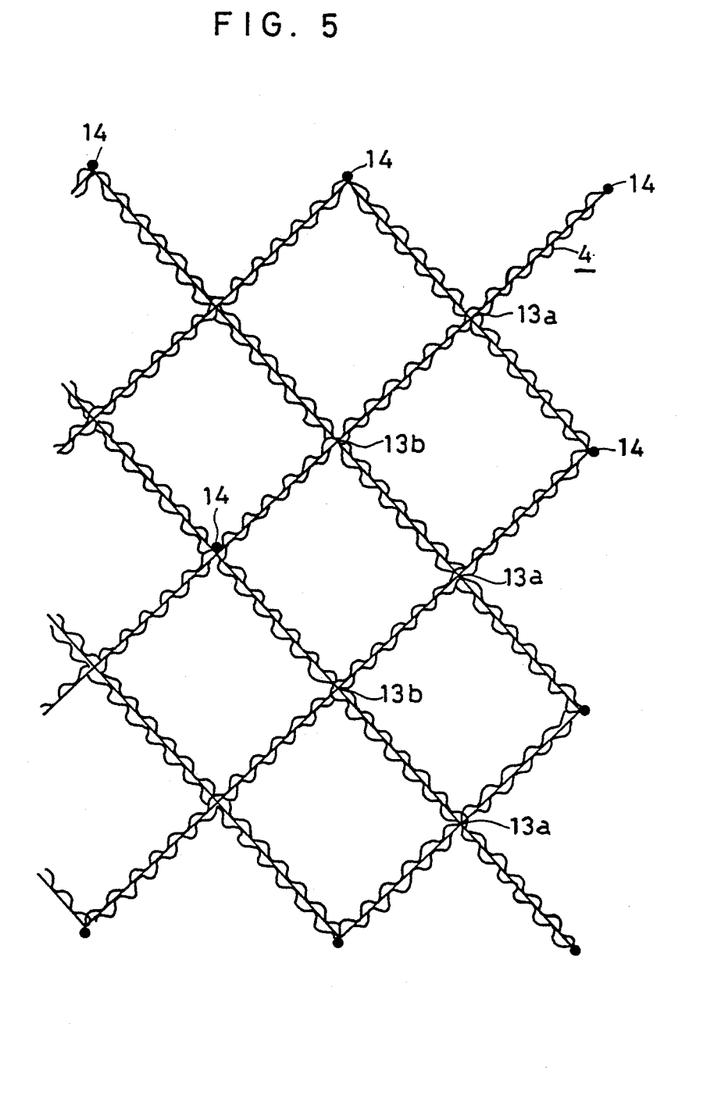
FIG. 5 is a plan view showing the twisted flap forming sheet of FIG. 1 as stretched for use as a slope protective material.

When the threads 2 of the twisted flap forming sheet are pulled apart in directions along the thread rows and in directions perpendicular thereto, the sheet material 1 stretches into a reticular form with large meshes. FIG. 5 shows the sheet thus stretched as fixed to an embankment slope by anchors 14 for use as a slope protective material. As will be apparent from the drawing, the twisted flap forming sheet of the invention readily covers the slope over a wide area, and the raised curved flaps 1b retains the soil three-dimensionally, thus exhibiting outstanding soil retaining ability. The same result can be achieved using the sheet of FIG. 1 by connecting strips into a net like the present embodiment.

Figure 6:
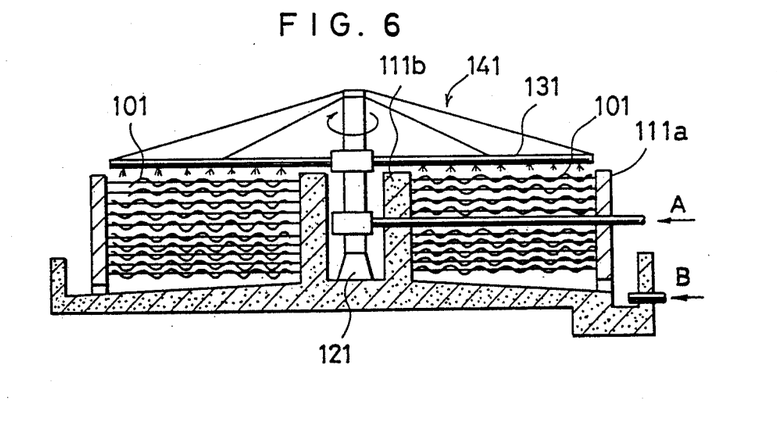
FIG. 6 is a front view showing a sewage treating aeration tank wherein the twisted flap forming sheet of FIG. 4 is stretched for use as a water treating contact material.

When the threads 2 of the twisted flap forming sheet of the present embodiment are pulled at their ends chiefly in the directions along the thread rows, the curved flaps 1b are closely arranged, forming a net having a great surface area relative to its volume and advantageously usable as a contact material. FIG. 6 shows the sheet of the present embodiment for use as a water contact material in sewage treating aeration tank of the sprinkler type.

In FIG. 6, indicated at 101 are reticular pieces of water contact material. Indicated at 111a is an outer support wall serving as the outer peripheral wall of the tank, at 111b an inner peripheral wall accommodating a rotating device 121, and at 131 a sprinkler pipe. The pieces of contact material extend horizontally between the support walls 111a, 111b, provided in a multiplicity of layers and arranged nearly equidistantly circumferentially of the tank.

The sewage applied from the sprinkler pipe 131 to the contact material 101 thus provided in a bed 141 as stretched flows down the surface of the material 101.

In the sprinkler bed 141 employing the contact member 101, reticular pieces of filling material are easy to clean or replace. Since the curved flaps 1b of the contact material 101 move, the downwardly flowing sewage can be contacted therewith with a high efficiency. The use of the sheet shown in FIG. 1 achieves the same result when strips of such sheet are supported as closely arranged side by side.

The present embodiment and the twisted flap forming sheet of FIG. 1 are advantageously used also as underwater nurseries for vegetables, artificial fish-breeding shelters and hydroponic culture beds in addition to the above applications, utilizing their configuration of having flaps raised with respect to the thread.

Figure 7:
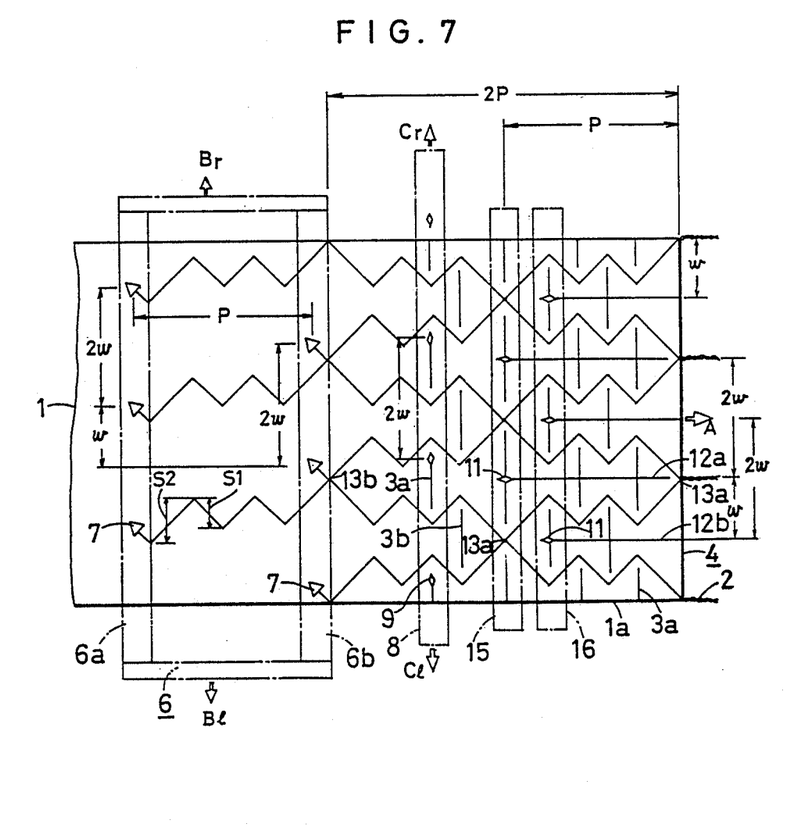
FIG. 7 is a diagram for illustrating a method of producing the twisted flap forming sheet of FIG. 4.

FIG. 7 is a diagram showing an example of process for producing the twisted flap forming sheet of the above embodiment. For the sake of convenience, a reduced number of rows of stitching threads are shown. In the illustrated case, a sheet material 1 of large width is moved in a direction of arrow A perpendicular to the width thereof. A sewing machine 6 and slitters 8, 15, 16 are in operation for stitching and for forming incisions. The sewing machine 6 comprises a first machine member 6a having needles 7 arranged at a spacing of 2w which is twice the distance w between the rows of threads 2, and a second machine member 6b having needles 7 each positioned at a distance w away from the corresponding needle 7 of the first machine member 6a widthwise of the sheet material and at a distance p (pitch of thread intersections) away from the same toward the direction of movement of the sheet material. The first and second machine members 6a, 6b reciprocatingly move a predetermined number of times in the widthwise directions (indicated by arrows Bl and Br) of the sheet material with an amplitude of S1. Every time the machine members perform the predetermined number of reciprocations, the members perform one reciprocation with a great amplitude S2 as deflected toward either direction alternately. During the period after one of the first and second machine members 6a and 6b performs a reciprocation with the great amplitude S2 and before the other member performs a reciprocation with the great amplitude S2, the sheet material 1 is moved by a distance p. In this way, each thread 2 is attached to the sheet material 1 in a triangular wave pattern, with vertexes projected to a higher level than the other vertexes at an interval of a specified wave number, intersecting the higher vertexes of the threads 2 at its opposite sides alternately to form intersections 13a, 13b. In the sheet material, the first slitter 8 forms incisions 3a, 3b widthwise of the sheet material, and the second slitters 15, 16 form incisions 12a, 12b along the rows of threads. The first slitter 8 has cutting blades 9 arranged at a spacing 2w widthwise of the sheet material, is shifted by a distance w widthwise of the sheet material every time the sheet material 1 moves by one-half the wavelength of the triangular wave pattern of the thread, and thereafter moves the blades 9 widthwise of the sheet material (indicated at Cl or Cr) a predetermined distance, whereby incisions 3a, 3b are formed. The second slitter 15 is a front slitter having blades 11 arranged at a spacing 2w widthwise of the sheet material. The second slitter 16 is a rear slitter 16 having a cutting blade 11 positioned at a distance w away from the corresponding blade 11 of the front slitter widthwise of the sheet material and at a suitable distance away from the same toward the direction of the movement of the sheet material. These slitters operate independently of each other to form longitudinal incisions 12a and 12b between positions close to the intersections 13a and 13b, and the next intersections 13a and 13b.

With the method of the present embodiment, the threads and incisions are not in a simple arrangement but are related to each other, whereas the sheet can be produced by a sequence of steps to achieve high productivity.

Figure 8:
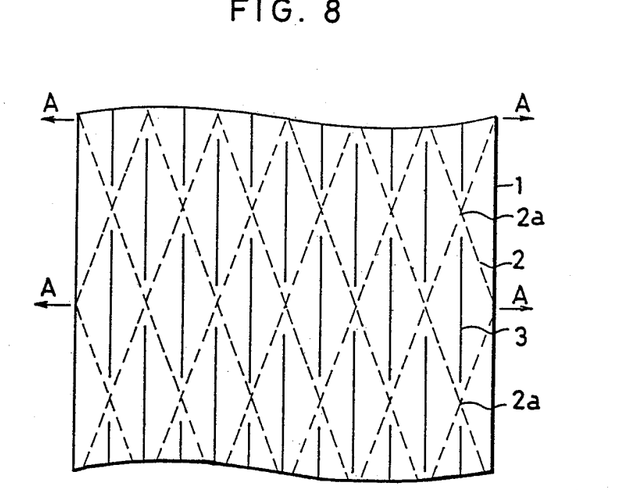
FIG. 8 is a plan view showing another twisted flap forming sheet embodying the invention.
Figure 9:
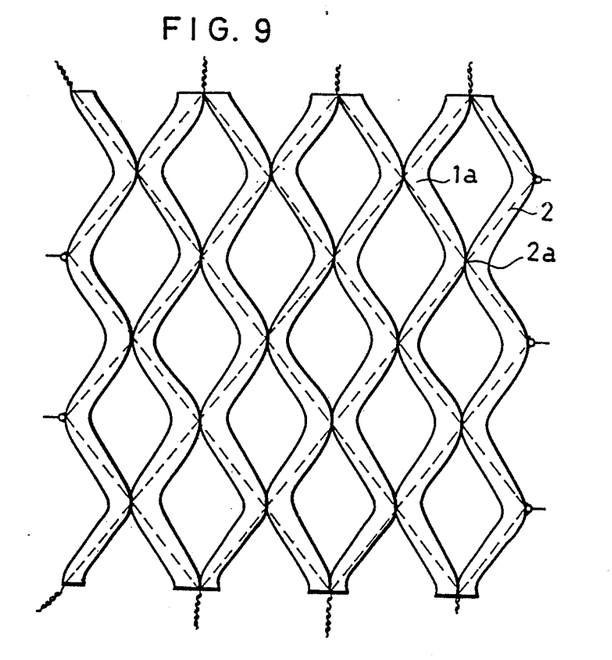
FIG. 9 is a plan view showing the twisted flap forming sheet of FIG. 8 as stretched.

FIG. 8 shows another embodiment of twisted flap forming sheet of the invention. As will be apparent from the following description, the sheet also functions as a net forming member. The twisted flap forming sheet comprises a sheet material 1 of increased width as in the foregoing embodiment, and a plurality of threads 2 attached by sewing to the sheet material in a reticular pattern over the entire area thereof. The thread 2 is of the same material as in the foregoing cases and is attached by usual stitches, loop stitches or double-loop stitches to form rhombic meshes. Each mesh of the sheet material is formed with an incision extending between positions close to diagonally opposed corners 2a of the mesh, such incisions being formed in parallel to one another. When the sheet material 1 is stretched by pulling apart the ends of threads 2 at the edges of the material in directions (indicated by arrows A) transversely of the incisions, raised flaps 1a are formed which are inclined with respect to the longitudinal direction of the threads 2 by virtue of the presence of the incisions 3 (see FIG. 9).

As already described with reference to the foregoing embodiments, the member thus stretched into a reticular form is advantageously usable as a slope protecting material, contact material, underwater nursery for vegetables, artificial fish-breeding shelter and hydroponic culture bed. The thread 2 can be composed, for example, of two or more nylon filaments (grade number 3. In this case, the use of multifilaments gives correspondingly improved tensile strength to the member, rendering the member stretchable by a greater force.

Figure 10:
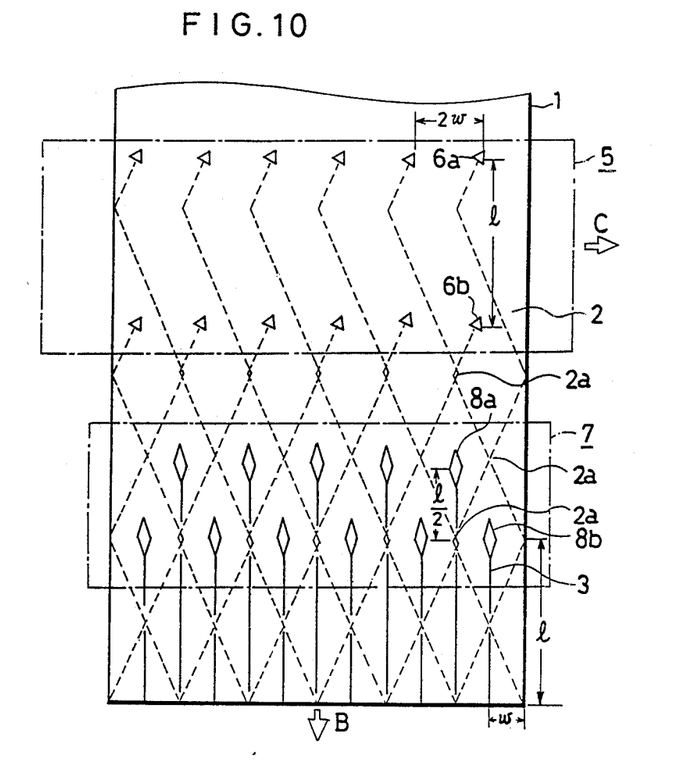
FIG. 10 is a diagram for illustrating a method of producing the twisted flap forming sheet of FIG. 8.

FIG. 10 is a diagram for illustrating an example of method for producing the twisted flap forming sheet of the present embodiment. It is seen that a sheet material 1 is moved in the direction of arrow B, with sewing machines 6a, 6b and cutting blades 8a, 8b in operation for sewing and forming incisions. The sheet material 1 are 1.2 m in entire width to form 12 net forming pieces having a width w of 10 cm. Indicated at 5 is a sewing machine having needles 6a arranged at a spacing of 2w, and needles 6b positioned at a distance w away from the respective needles 6a widthwise of the sheet material and at a distance l away from the needles 6b in the direction of movement of the sheet material, the needles being 12 in total number. These needles 6a, 6b are reciprocatingly moved in the direction of arrow c and in a direction opposite thereto in synchronism with the speed of movement of the sheet material 1. Since the needles 6a are at the distance l from the needles 6b, threads can be attached in a rhombic mesh pattern by changing the direction of reciprocating movement every time the sheet material 1 is moved the distance l. Indicated at 7 is a slitter having cutting blades 8a arranged at a spacing of 2w widthwise of the sheet material, and cutting blades 8b positioned at a distance w away from the respective blades 8a widthwise of the sheet and at a distance of l/2 in the direction of movement of the sheet, the blades being 12 in total number. These blades 8a, 8b move perpendicular to the plane of the drawing as timed with the movement of the sheet material 1 to form incisions each extending between positions close to opposed corners of the rhombic mesh.

The method of the present embodiment therefore stitches the sheet material and forms incisions therein by a sequence of steps to achieve improved productivity in manufacturing twisted flap forming sheets.

We claim:

1. A sheet for forming twisted flaps in a continuous arrangement comprising a strip having incisions extending widthwise thereof alternately from its opposite side edges beyond the longitudinal center line of the strip, and a stitching thread attached to the strip by stitching and extending longitudinally of the strip in a wave pattern through a position in the vicinity of the terminal end of each of the incisions, so that when the stitching thread is pulled apart at its opposite ends, the strip forms raised and curved flaps inclined with respect to the longitudinal direction of the stretched thread.

2. A twisted flap forming sheet as defined in claim 1 wherein the thread is attached to the strip by stitching with usual stitches, loop stitches or double-loop stitches.

3. A twisted flap forming sheet as defined in claim 1 wherein the strip is a woven fabric, nonwoven fabric, synthetic resin sheet, perforated sheet obtained by forming small holes in one of these materials, or sheet having an expanded material provided over at least one side thereof.

4. A twisted flap forming sheet as defined in claim 1 for use as a slope protective material.

5. A twisted flap forming sheet as defined in claim 1 for use as a contact material for water treatment.

6. A twisted flap forming sheet as defined in claim 1 for use as an underwater nursery for vegetables.

7. A twisted flap forming sheet as defined in claim 1 for use as an artificial fish-breeding shelter.

8. A twisted flap forming sheet as defined in claim 1 for use as a hydroponic culture bed.

9. A sheet for forming twisted flaps in a continuous arrangement comprising a piece of sheet material and a plurality of stitching threads extending on the sheet material in the same direction in a plurality of rows of wave pattern and attached to the sheet material by stitching, each of the threads intersecting wave vertexes of the adjacent threads at its opposite sides alternately at an interval of a predetermined number of waves of the wave pattern to form intersections, the sheet material being formed with a longitudinal incision extending between two intersections adjacent to each other in the direction in which the threads extend in rows and with transverse incisions extending from the longitudinal incision transversely thereof to positions close to the respective vertexes, remote from each other, of the thread wave pattern, so that when the stitching threads are pulled apart at their opposite ends, the sheet material forms raised, curved flaps inclined with respect to the longitudinal direction of the stretched thread.

10. A twisted flap forming sheet as defined in claim 9 wherein the thread is attached to the sheet material by stitching with usual stitches, loop stitches or double-loop stitches.

11. A twisted flap forming sheet as defined in claim 9 wherein the sheet material is a woven fabric, nonwoven fabric, synthetic resin sheet, perforated sheet obtained by forming small holes in one of these materials, or sheet having an expanded material provided over at least one side thereof.

12. A twisted flap forming sheet as defined in claim 9 for use as a slope protective material.

13. A twisted flap forming sheet as defined in claim 9 for use as a contact material for water treatment.

14. A twisted flap forming sheet as defined in claim 9 for use as an underwater nursery for vegetables.

15. A twisted flap forming sheet as defined in claim 9 for use as an artificial fish-breeding shelter.

16. A twisted flap forming sheet as defined in claim 9 for use as a hydroponic culture bed.

17. A sheet for forming twisted flaps in a continuous arrangement comprising a piece of sheet material and a plurality of stitching threads attached to the sheet material by stitching in a reticular pattern, the sheet material having incisions parallel to one another and each formed in each mesh of the pattern, the incision extending between positions close to opposed corners of the mesh, so that when the sheet material is stretched by pulling the threads apart at their ends at the corners of the sheet material transversely of the incisions, the sheet material is opened at the incisions and forms raised, curved flaps inclined with respect to the longitudinal direction of the thread.

18. A twisted flap forming sheet as defined in claim 17 wherein the thread is attached to the sheet material by stitching with usual stitches, loop stitches or double-loop stitches.

19. A twisted flap forming sheet as defined in claim 17 wherein the sheet material is a woven fabric, nonwoven fabric, synthetic resin sheet, perforated sheet obtained by forming small holes in one of these materials, or sheet having an expanded material provided over at least one side thereof.

20. A twisted flap forming sheet as defined in claim 17 for use as a slope protective material.

21. A twisted flap forming sheet as defined in claim 17 for use as a contact material for water treatment.

22. A twisted flap forming sheet as defined in claim 17 for use as an underwater nursery for vegetables.

23. A twisted flap forming sheet as defined in claim 17 for use as an artificial fish-breeding shelter.

24. A twisted flap forming sheet as defined in claim 17 for use as a hydroponic culture bed.

25. A method of producing a sheet for forming twisted flaps in a continuous arrangement, the method including the steps of attaching a stitching thread to a sheet material by stitching in a plurality of rows in a wave pattern and extending in the same direction to each other, successively forming transverse incisions each extending between positions close to vertexes, remote from each other, of stitches of the wave pattern thread rows adjacent to each other, and cutting the sheet material into separate pieces between the adjacent thread rows.

26. A method of producing a sheet for forming twisted flaps in a continuous arrangement, the method including the first stitching step of attaching a first stitching thread to a sheet material by stitching in a plurality of rows extending in the same direction and arranged at a predetermined spacing, each row having stitches in a wave pattern and vertexes projecting to a higher level than the other vertexes thereof at an interval of a specified wave number, the second stitching step of attaching a second stitching thread to the sheet material by stitching in a wave pattern between the thread rows, the second thread having vertexes projecting to a higher level than the other vertexes thereof at an interval of a specified wave number and each intersecting the higher vertex of the first thread to form an intersection, the first incision forming step of successively forming transverse incisions each extending between positions close to verexes, remote from each other, of wave pattern stitches of the first and second threads adjacent to each other, and the second incision forming step of successively forming longitudinal incisions each extending between positions close to each two intersections of the first and second threads adjacent to each other in the direction in which the thread rows extends.

27. A method of producing a sheet for forming twisted flaps in a continuous arrangement including the steps of attaching a stitching thread to a sheet material in a reticular pattern by moving a plurality of stitching needles zigzag to form intersecting stitches on the sheet material, and successively forming incisions in the sheet material in parallel to one another and each extending between positions close to opposed corners of each mesh.

* * * * *